…

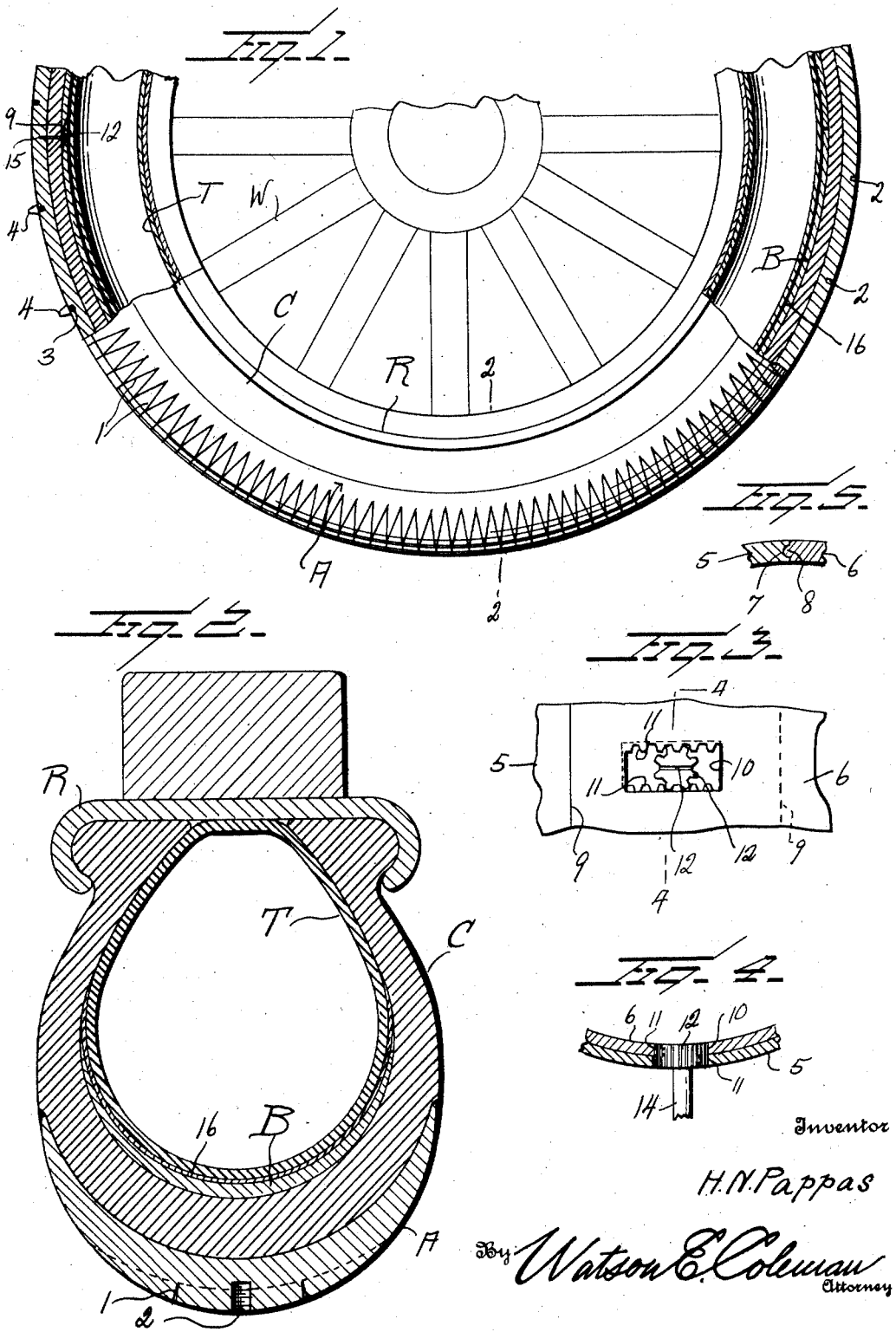

UNITED STATES PATENT OFFICE.

HARRY N. PAPPAS, OF OKMULGEE, OKLAHOMA.

PROTECTING-ARMOR FOR TIRES.

1,388,597.　　　　　Specification of Letters Patent.　　Patented Aug. 23, 1921.

Application filed May 11, 1921. Serial No. 468,511.

*To all whom it may concern:*

Be it known that I, HARRY N. PAPPAS, a citizen of the United States, residing at Okmulgee, in the county of Okmulgee and State of Oklahoma, have invented certain new and useful Improvements in Protecting-Armors for Tires, of which the following is a specification, reference being had to the accompanying drawings.

This invention relates to certain improvements in protecting armors for tires and has relation more particularly to an armor especially designed and adapted for use in connection with the casing of an inflatable tire, and it is an object of the invention to provide an armor of this general character which includes elements adapted to be arranged both externally and internally of the casing whereby said casing is protected effectually against puncture, and whereby the life of the casing is otherwise materially prolonged.

Another object of the invention is to provide a novel and improved armor of this general character including an expansible internal member extending circumferentially of the tire and wherein means are provided for extending said member so that the same will have requisite coaction with the casing.

An additional object is to provide a novel and improved armor of this general character embodying an external member and an internal member, both extending circumferentially of the tire, or more particularly the casing thereof, at the tread portion and wherein means are provided common to both of the members for holding said members against movement relative to the tire and particularly in a circumferential direction.

Furthermore it is an object of the invention to provide a novel and improved armor of this general character including an internal member consisting of two sections, adjacent end portions interlocking or interfitting, while the opposite end portions have coacting therewith means whereby said internal member may be expanded or contracted as the occasions of practice may necessitate.

In order that my invention may be the better understood, I will now proceed to describe the same with reference to the accompanying drawings, wherein:

Figure 1 is a fragmentary view partly in elevation and partly in section illustrating a protecting armor constructed in accordance with an embodiment of my invention and in applied position.

Fig. 2 is an enlarged sectional view taken substantially on the line 2—2 of Fig. 1.

Fig. 3 is a fragmentary view illustrating in plan the means for expanding the internal member.

Fig. 4 is a sectional view taken substantially on the line 4—4 of Fig. 3.

Fig. 5 is a fragmentary sectional view illustrating in detail the interlocking ends of the sections of the internal member.

As disclosed in the accompanying drawings, C denotes a tire casing or carcass of a type now generally in use and which is applied in a conventional manner to the rim R of the wheel structure W. Arranged within the casing or carcass C is an inner tube T.

My improved armor comprises two members A and B, the member A being externally applied and the member B being internally applied.

The member A is annular and is of such cross sectional configuration to snugly receive the tread portion of the casing C, said casing C being applied within the member A before the inner tube T is inflated.

The member A is preferably made of hardened steel and its external face at the tread portion thereof is provided entirely therearound with the transversely directed grooves 1 whereby the said member A has a tread surface to mesh with the roadway or other surface over which the wheel W may traverse in a manner to prevent slipping.

The member A in its outer surface is also provided therearound with a series of circumferentially spaced sockets 2 arranged at substantially the transfer center of the member A. The shanks 3 of the calks or lugs 4 are adapted to be threaded into the sockets 2 and these calks or lugs 4 are particularly adapted for use when it is desired to extract the wheel from a mud hole or the like. Under normal conditions the calks or lugs 4 are not used but are carried either by a person or in a suitable place of storage in the vehicle. In the event the wheel W should be held within a mud hole or the like, the calks or lugs 4 are then applied to the member A to facilitate the extraction of the wheel. After the wheel has been removed from the mud hole or the like, the calks or lugs 4 are removed.

The outer or external member A is made of one piece of material and is of a width and cross sectional configuration to have its opposite side marginal portions extend a material distance inwardly of the side face or wall of the casing or carcass C. The applied member A affords an effective protection against puncture by glass, nails or the like, and also protects the casing against wear to which it would otherwise be subjected in use as the member A rides or contacts directly with the roadway or other surface. The grooves 1 hereinbefore referred to are cut relatively deep within the member A with the side walls substantially radial with respect to wheel W and whereby the grooves 1 provide effective means to prevent slipping or skidding, and also materially help to speed up the vehicle.

The internal member B is preferably made of soft steel and comprises two substantially semicircular sections 5 and 6. An end or edge wall of the section 5 has disposed entirely therealong a groove or mortise 7, preferably substantially circular in cross section and which is adapted to substantially snugly receive an outstanding tenon or rib 8 carried by the coacting end or edge wall of the second section 6.

The opposite end portions of the sections 5 and 6 of the member B overlap, and said overlapping portions 9 are reversely beveled to permit expansion of the member B without any resultant space between said end portions of the sections 5 and 6.

Each of the sections 5 and 6 is of a cross sectional configuration substantially conforming to the inner face of wall of the tread portion of the casing or carcass C and when the member B is applied within the casing or carcass C, said member B is disposed circumferentially of said casing or carcass, and the applied member B, in addition to providing further protection against puncture, serves as a reinforcement of the tread portion of the casing or carcass C and such reinforcement is of particular advantage when my improved armor is applied to casing which has been unduly worn.

The overlapping portions of the sections 5 and 6 of the internal member B are provided with the circumferentially directed slots 10, and each of said slots has extending inwardly thereof the teeth 11, said teeth being arranged along a side of one of the slots 11 and the opposite side of the second slot. Meshing with the teeth 11 is a toothed head 12 carried by a bolt 14 extending through the casing or carcass C and having threaded engagement within the socket 15 produced in the inner face of the member A at substantially the transfer center thereof. Upon rotating the head 12 and bolt 14 in one direction the member B will be expanded to assure said member having close and tight contact with the inner surface of the casing or carcass C. Rotation of the said head 12 and bolt 14 in the opposite direction results in the contraction of the member B so that the same may be readily removed when desired. When the member B is applied, it is to be understood that the casing or carcass C is disengaged from the rim R and by having the member B comprised of the two sections 5 and 6 the application or removal of said member B is materially facilitated.

After the member B has been properly applied within the casing or carcass C and before the tube T is inserted, a liner 16 of canvas or the like is arranged within the casing or carcass C and over the applied member B. This liner 16 serves to protect the tube T against any possible injury thereto by the member B.

When the bolt 14 is in applied position, the outer face of the head 12 is substantially flush with the concave surface of the member B so that the possibility of said bolt 14 or more particularly the head 12 thereof injuring the applied tube T is substantially eliminated.

The bolt 14 also serves to provide means to hold the applied members A and B against independent movement relative to the casing or carcass C and particularly in a circumferential direction.

While any means may be employed to effect the requisite rotation of the bolt 14, I herein disclose the outer face of the head 12 provided with a groove 17 in which is adapted to be engaged a screw driver or kindred tool.

While in practice, the members A and B can be employed one independently of the other but it is preferred that they be used jointly.

From the foregoing description it is thought to be obvious that a protecting armor for tires constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. An internal armor for a tire casing embodying an expansible member adapted to coact with the tread portion of the casing and extend circumferentially therearound, and means for expanding or contracting said member.

2. An internal armor for a tire casing embodying an expansible member adapted to coact with the tread portion of the casing and extend circumferentially therearound, said member being provided with overlapping end portions and means coacting with said overlapping end portions for expanding or contracting the member.

3. An internal armor for a tire casing embodying an expansible member adapted to coact with the tread portion of the casing and extend circumferentially therearound, said member including overlapping end portions, said overlapping end portions being provided with circumferentially disposed slots and having teeth extending within the slots and a toothed member engageable with said teeth for expanding or contracting the member.

4. An internal armor for a tire casing embodying an expansible member adapted to coact with the tread portion of the casing and extend circumferentially therearound, said member comprising two sections, adjacent ends of the sections interlocking, the opposite end portions of the sections overlapping, and means coacting with the overlapping portions for expanding or contracting the member.

5. In combination with a tire casing, an annular member of a cross sectional configuration to snugly receive the tread portion of the casing and an expansible member extending circumferentially of the casing and arranged therein, said expansible member coacting with the tread portion of the casing.

6. In combination with a tire casing, an annular member of a cross sectional configuration to snugly receive the tread portion of the casing and an expansible member extending circumferentially of the casing and arranged therein, said expansible member coacting with the tread portion of the casing, and means disposed through the casing and engageable with the first named member for expanding or contracting the second named member.

In testimony whereof I hereunto affix my signature.

HARRY N. PAPPAS.